United States Patent
Chen et al.

(10) Patent No.: US 12,180,613 B2
(45) Date of Patent: Dec. 31, 2024

(54) ELECTROSPINNING METHOD FOR FABRICATING NANOFIBER AIR FILTER WITH MINIMIZED PRESSURE DROP

(71) Applicant: HONG KONG CENTRE FOR LOGISTICS ROBOTICS LIMITED, Hong Kong (HK)

(72) Inventors: Chun Chen, Hong Kong (HK); Zhuolun Niu, Hong Kong (HK); Ye Bian, Hong Kong (HK); Li Zhang, Hong Kong (HK)

(*) Notice: Subject to any disclaimer, the term of this patent is extended or adjusted under 35 U.S.C. 154(b) by 187 days.

(21) Appl. No.: 17/932,317

(22) Filed: Sep. 15, 2022

(65) Prior Publication Data

US 2023/0383441 A1    Nov. 30, 2023

(30) Foreign Application Priority Data

May 24, 2022   (CN) .......................... 202210576055.1

(51) Int. Cl.
*D01D 5/00*   (2006.01)
*B01D 39/16*  (2006.01)
(Continued)

(52) U.S. Cl.
CPC ......... *D01D 5/003* (2013.01); *B01D 39/1623* (2013.01); *B01D 46/0001* (2013.01);
(Continued)

(58) Field of Classification Search
CPC ........ D01D 5/003; D01D 5/0038; D01D 5/04; D10B 2505/04; B01D 39/1623;
(Continued)

(56) References Cited

PUBLICATIONS

Aliabadi, Effect of electrospinning parameters on the air filtration performance using electrospun polyamide-6 nanofibers, Chem. Ind. Chem. Eng. Q. 23 (4) (2017) (Year: 2017).*

(Continued)

*Primary Examiner* — Yunju Kim

(57) ABSTRACT

The present disclosure provides an electrospinning method for fabricating a nanofiber air filter with a minimized pressure drop. The method comprises following steps: S1. dissolving a specified amount of powder polymer material in a solvent, and magnetically stirring a resulting solution; adding the solution to a syringe connected with a microneedle by a plastic tube, and pumping the solution by the syringe into an electrospinning machine; S2. allowing the electrospinning machine to work under a high voltage, such that the solution generates nanofibers; the nanofibers are interweaved to fabricate air filters for removing particles in air with a particle removal efficiency $\eta(V_m, t_n)$ and pressure drop $\Delta P(V_m, t_n)$, $V_m$ is electrospinning voltage and $t_n$ is electrospinning time; and S3. finding optimal electrospinning voltage $V_{opt}$ and optimal electrospinning time $t_{opt}$, such that an air filter fabricated by $V_{opt}$ and $t_{opt}$ can achieve target particle removal efficiency $\eta_{tar}$ and minimized pressure drop $\Delta P_{min}$.

10 Claims, 4 Drawing Sheets

(51) Int. Cl.
*B01D 46/00* (2022.01)
*B01D 46/54* (2006.01)
*D01D 1/02* (2006.01)

(52) U.S. Cl.
CPC ............ *B01D 46/546* (2013.01); *D01D 1/02* (2013.01); *B01D 2239/025* (2013.01); *B01D 2239/0631* (2013.01); *B01D 2239/10* (2013.01); *D10B 2505/04* (2013.01)

(58) Field of Classification Search
CPC ...... B01D 2239/025; B01D 2239/0631; B01D 2239/10; B01D 46/0001; B01D 46/546
See application file for complete search history.

(56) References Cited

PUBLICATIONS

Dehghan et al., Optimization of electrospinning parameters for polyacrylonitrile-MgO nanofibers applied in air filtration, Journal of the Air & Waste Management Association, 2016, vol. 66, No. 9 (Year: 2016).*

Niu et al., An optimization approach for fabricating electrospun nanofiber air filters with minimized pressure drop for indoor PM2.5 control, Building and Environment 188 (2021) (Year: 2021).*

Zhou et al., Electrospun Nanofiber Membranes for Air Filtration: A Review, Nanomaterials 2022, 12 (Year: 2022).*

* cited by examiner

ELECTROSPINNING METHOD FOR FABRICATING NANOFIBER AIR FILTER WITH MINIMIZED PRESSURE DROP

RELATED APPLICATION

This patent application claims priority to Chinese Patent Application No. 202210576055.1, filed with the Chinese Patent Office on May 24, 2022, which is incorporated herein by reference in their entireties.

TECHNICAL FIELD

The present disclosure relates to the technical field of electrospinning, and in particular to an electrospinning method for fabricating a nanofiber air filter with a minimized pressure drop.

BACKGROUND

Filtration is one of the most effective methods for removing particulate air pollutants. However, with the use of traditional fibrous filters, such as high-efficiency particulate air (HEPA) filters, the pressure drop can be very high, which results in increased fan energy consumption.

To overcome this challenge, the manufacturing technique of electrospinning has been used to fabricate nanofiber air filters, which can achieve a lower pressure drop than traditional fibrous filters. However, the current electrospinning method doesn't guarantee obtaining a nanofiber air filter with the desired particle removal efficiency and a low pressure drop.

Therefore, it is worthwhile to develop an electrospinning method for fabricating nanofiber air filters with the optimal performance, i.e., under a target particle removal efficiency while pressure drop is minimized.

SUMMARY

The present disclosure provides an electrospinning method for fabricating a nanofiber air filter with a minimized pressure drop to solve the technical problem raised in the above background.

An electrospinning method for fabricating a nanofiber air filter comprises the following steps:

S1. dissolving a specified amount of powder polymer material in a solvent, and magnetically stirring a resulting solution; adding the solution to a syringe connected with a microneedle by a plastic tube, and pumping the solution by the syringe into an electrospinning machine;

S2. allowing the electrospinning machine to work under a high voltage, such that the solution generates nanofibers; the nanofibers are interweaved to fabricate air filters for removing particles in air with a particle removal efficiency $\eta(V_m, t_n)$ and pressure drop $\Delta P(V_m, t_n)$, $V_m$ is electrospinning voltage and $t_n$ is electrospinning time; and S3. finding optimal electrospinning voltage $V_{opt}$ and optimal electrospinning time $t_{opt}$, such that an air filter fabricated by $V_{opt}$ and $t_{opt}$ can achieve target particle removal efficiency $\eta_{tar}$ and minimized pressure drop $\Delta P_{min}$.

In an embodiment, the powder polymer material is polyacrylonitrile (PAN), polyvinylidene difluoride (PVDF), polystyrene (PS), or polyvinylpyrrolidone (PVP).

In an embodiment, the microneedle is perpendicular to a rotator, the nanofibers are collected by the rotator covered by a copper mesh.

In an embodiment, the electrospinning machine prepares the nanofibers respectively under M different electrostatic spinning voltages and N different spinning time conditions; M is an integer no less than 5, N is an integer no less than 3; m is an integer no less than 1 and no larger than M, n is an integer no less than 1 and no larger than N.

In an embodiment, the pressure drop $\Delta P(V_m, t_n)$ is measured by a manometer.

In an embodiment, particle concentrations of upstream flow $C_1$ and downstream flow $C_2$ are measured by particle counters, and the particle removal efficiency $\eta(V_m, t_n)$ is calculated by a following formula:

$$\eta = \frac{C_1 - C_2}{C_1} \times 100\%.$$

In an embodiment, the step of S3 comprises the following steps:

S31, drawing relationship curves between the particle removal efficiency $\eta(V_m, t_n)$ and the pressure drop $\Delta P(V_m, t_n)$; under the same particle removal efficiency, the relationship curve which achieves the lowest pressure is an optimal condition, and corresponding electrospinning voltage $V_m$ is the optimal voltage $V_{opt}$;

S32, selecting values of the $\eta(V_{opt}, t_n)$ and $t_n$ to fit a following polynomial function by mathematical software:

$\eta = f(t) = 1 - \exp(a \cdot t + b)$; wherein t represents electrospinning time, $\eta$ may represents particle removal efficiency, a and b are constants; and S33, setting a target particle removal efficiency $\eta_{tar}$, corresponding optimal electrospinning time $t_{opt}$ is calculated by the polynomial function $\eta = f(t)$.

In an embodiment, in the step of S31, the relationship curves are drawn in Excel software.

In an embodiment, in the step of S32, the mathematical software is MATLAB software.

In an embodiment, in the step of S1, the syringe and the microneedle are arranged vertically; the microneedle is arranged at a lower center of the syringe.

In an embodiment, in the step of S2, a Taylor cone is formed by the solution under the high voltage, and the nanofibers are continuously injected along a dynamic spiral trajectory.

BRIEF DESCRIPTION OF THE DRAWINGS

To describe the technical solutions in the embodiments of the present disclosure more clearly, the accompanying drawings required for describing the embodiments are briefly introduced below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Figure 1:
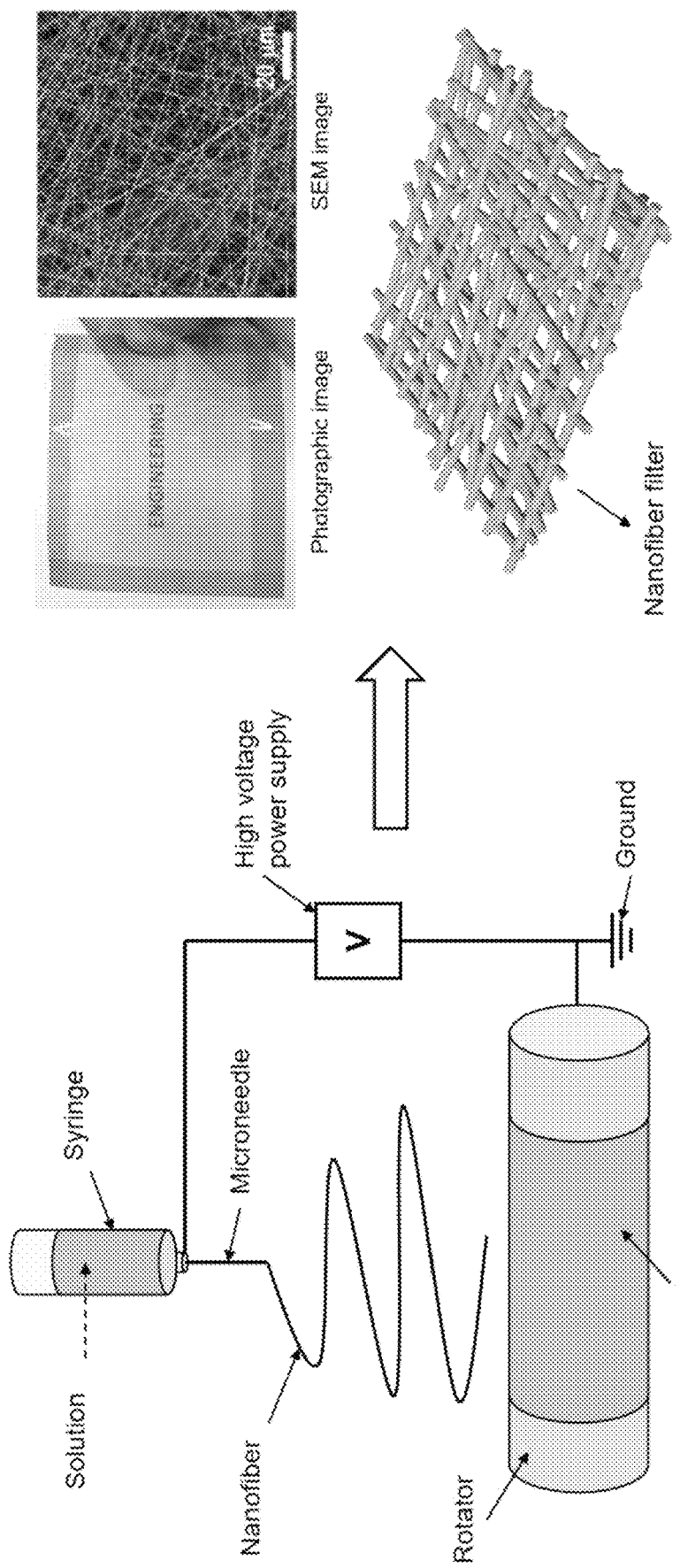
FIG. 1 is a schematic process diagram of the electrospinning method for fabricating a nanofiber air filter according to an embodiment of the present disclosure.
Figure 2:
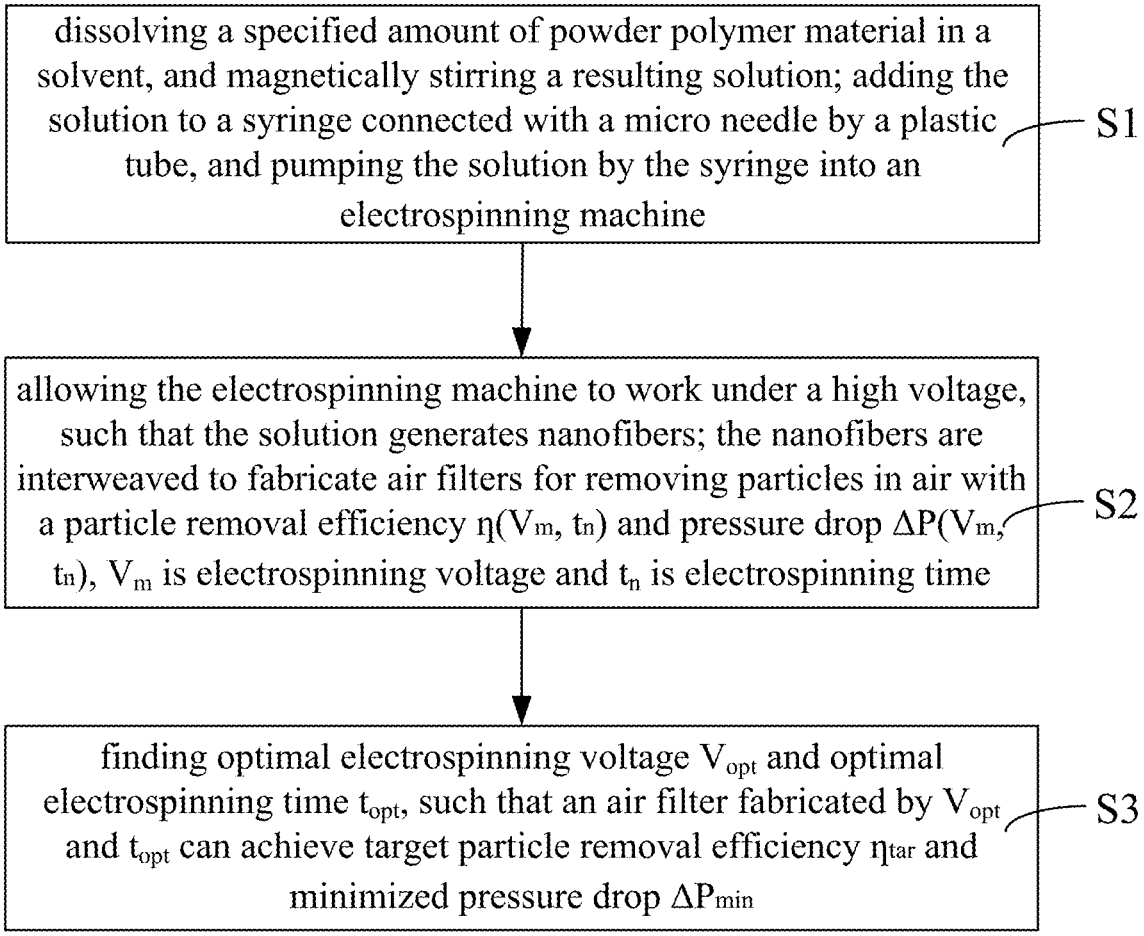
FIG. 2 is a schematic flowchart of the electrospinning method for fabricating a nanofiber air filter with a minimized pressure drop according to an embodiment of in the present disclosure.

The technical solutions in the examples of the present disclosure will be clearly and completely described below with reference to the drawings in the examples of the present disclosure. It should be understood that the specific examples described herein are merely intended to explain the present disclosure, rather than to limit the present disclosure. It should also be noted that, for convenience of description, only the parts related to the present disclosure are shown in the accompanying drawings. All other examples obtained by a person of ordinary skill in the art based on the examples of the present disclosure without creative efforts shall fall within the protection scope of the present disclosure.

When an "example" is mentioned herein, specific features, structures, or characteristics described in conjunction with the example may be included in at least one example of the present disclosure. The phrase appearing in different parts of the specification does not necessarily refer to the same example or an independent or alternative example exclusive of other examples. It may be explicitly or implicitly appreciated by those skilled in the art that the example described herein may be combined with other examples.

As shown in FIGS. 1-4, the electrospinning method for fabricating a nanofiber air filter with a minimized pressure drop includes the following steps:

S1. dissolving a specified amount of powder polymer material in a solvent, and magnetically stirring a resulting solution; adding the solution to a syringe connected with a microneedle by a plastic tube, and pumping the solution by the syringe into an electrospinning machine;

S2. allowing the electrospinning machine to work under a high voltage, such that the solution generates nanofibers; the nanofibers are interweaved to fabricate air filters for removing particles in air with a particle removal efficiency $\eta(V_m, t_n)$ and pressure drop $\Delta P(V_m, t_n)$, $V_m$ is electrospinning voltage and $t_n$ is electrospinning time; and S3. finding optimal electrospinning voltage $V_{opt}$ and optimal electrospinning time $t_{opt}$, such that an air filter fabricated by $V_{opt}$ and $t_{opt}$ can achieve target particle removal efficiency $\eta_{tar}$ and minimized pressure drop $\Delta P_{min}$.

In addition, in the prior art, many nanofiber air filters must be fabricated under different electrospinning voltages and times and tested to find filters with different target particle removal efficiencies, which makes a nanofiber air filter fabrication process very inconvenient, time-consuming, and costly; and although many different nanofiber air filters are fabricated and tested, there is no guarantee that a minimum pressure drop will be achieved.

However, the nanofiber air filter with a minimized pressure drop can be fabricated by an electrospinning method with modeling and optimization approach.

In this embodiment, the adopted polymer materials may be polyacrylonitrile (PAN), polyvinylidene difluoride (PVDF), polystyrene (PS), polyvinylpyrrolidone (PVP), etc.

In this embodiment, the microneedle may be perpendicular to the rotator and scan linearly, the electrospun nanofibers may be collected by a metallic rotator covered by a copper mesh.

In an embodiment, in the step of S1, the syringe and the microneedle are arranged vertically; the microneedle is arranged at a lower center of the syringe. In an embodiment, in the step of S2, a Taylor cone is formed by the solution under the high voltage, and the nanofibers are continuously injected along a dynamic spiral trajectory.

In this embodiment, the electrospinning machine prepares the nanofibers respectively under M different electrostatic spinning voltages and N different spinning time conditions. M may be an integer no less than 5, N may be an integer no less than 3; m maybe an integer no less than 1 and no larger than M, n may be an integer no less than 1 and no larger than N.

In this embodiment, the pressure drop $\Delta P(V_m, t_n)$ can be measured by a manometer. The particle concentrations of the upstream flow $C_1$ and downstream flow $C_2$ may be measured by particle counters, and the particle removal efficiency $\eta(V_m, t_n)$ may be calculated by the following formula:

$$\eta = \frac{C_1 - C_2}{C_1} \times 100\%.$$

In this embodiment, the relationship curves between the particle removal efficiency $V_m, t_n$) and pressure drop $\Delta P(V_m, t_n)$ of the air filter fabricated in S3 can be drawn in Excel.

In this embodiment, under the same particle removal efficiency, the curve which can achieve the lowest pressure is the optimal condition, and the corresponding electrospinning voltage $V_m$ is the optimal voltage $V_{opt}$.

In this embodiment, the $\eta(V_{opt}, t_n)$ and $t_n$ may satisfy the following exponential function:

$\eta = f(t) = 1 - \exp(a \cdot t + b)$, where t may represent the electrospinning time, $\eta$ may represent the particle removal efficiency, a and b may represent the constants.

In this embodiment, while setting a target particle removal efficiency $\eta_{tar}$, the corresponding optimal electrospinning time $t_{opt}$ that results in the minimized pressure drop may be calculated by the function $\eta = f(t)$.

In this embodiment, a nanofiber air filter may be fabricated under the optimal electrospinning voltage $V_{op}$ and the electrospinning time $t_{opt}$; and the nanofiber air filter may achieve the target particle removal efficiency $\eta_{tar}$ at a pressure drop $\Delta P_{min}$.

Figure 3:
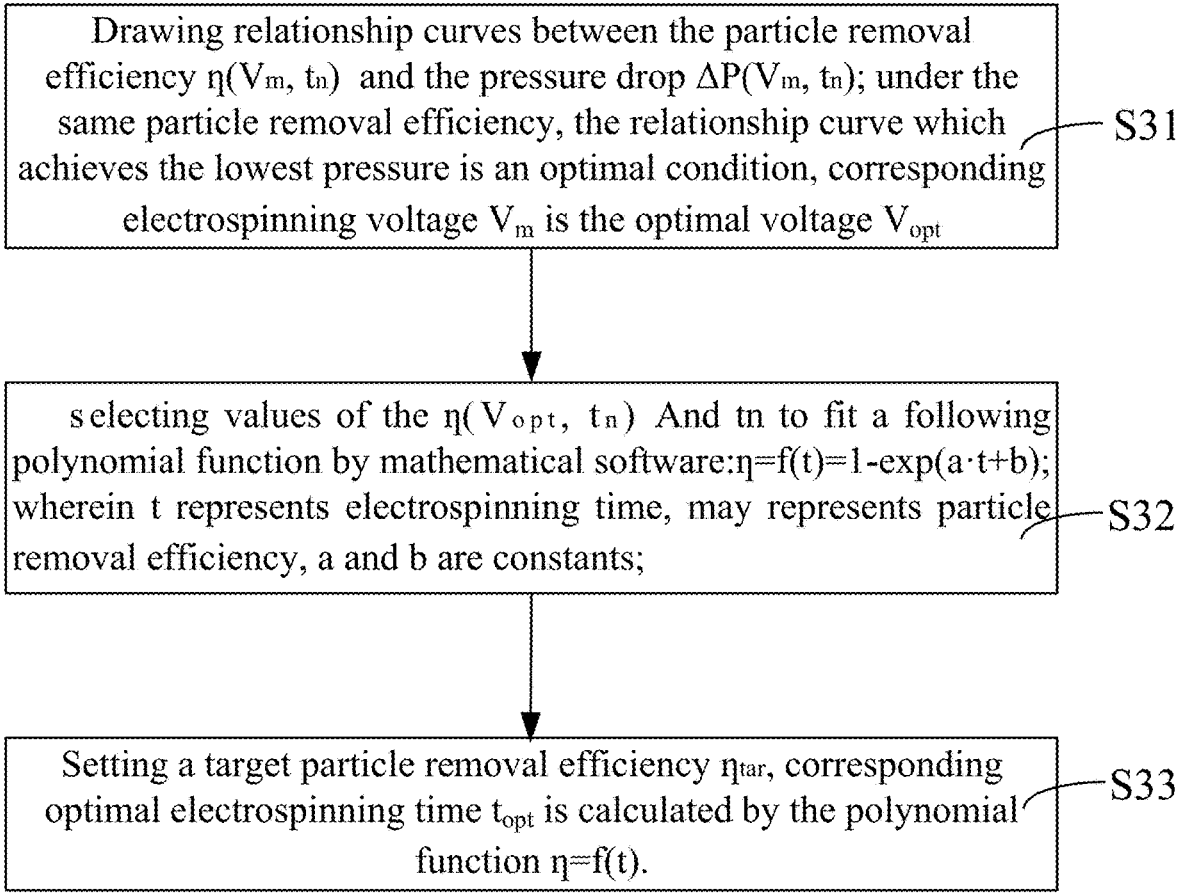
FIG. 3 is a schematic flowchart of the electrospinning method for fabricating a nanofiber air filter with a minimized pressure drop shown in FIG. 2.
Figure 4:
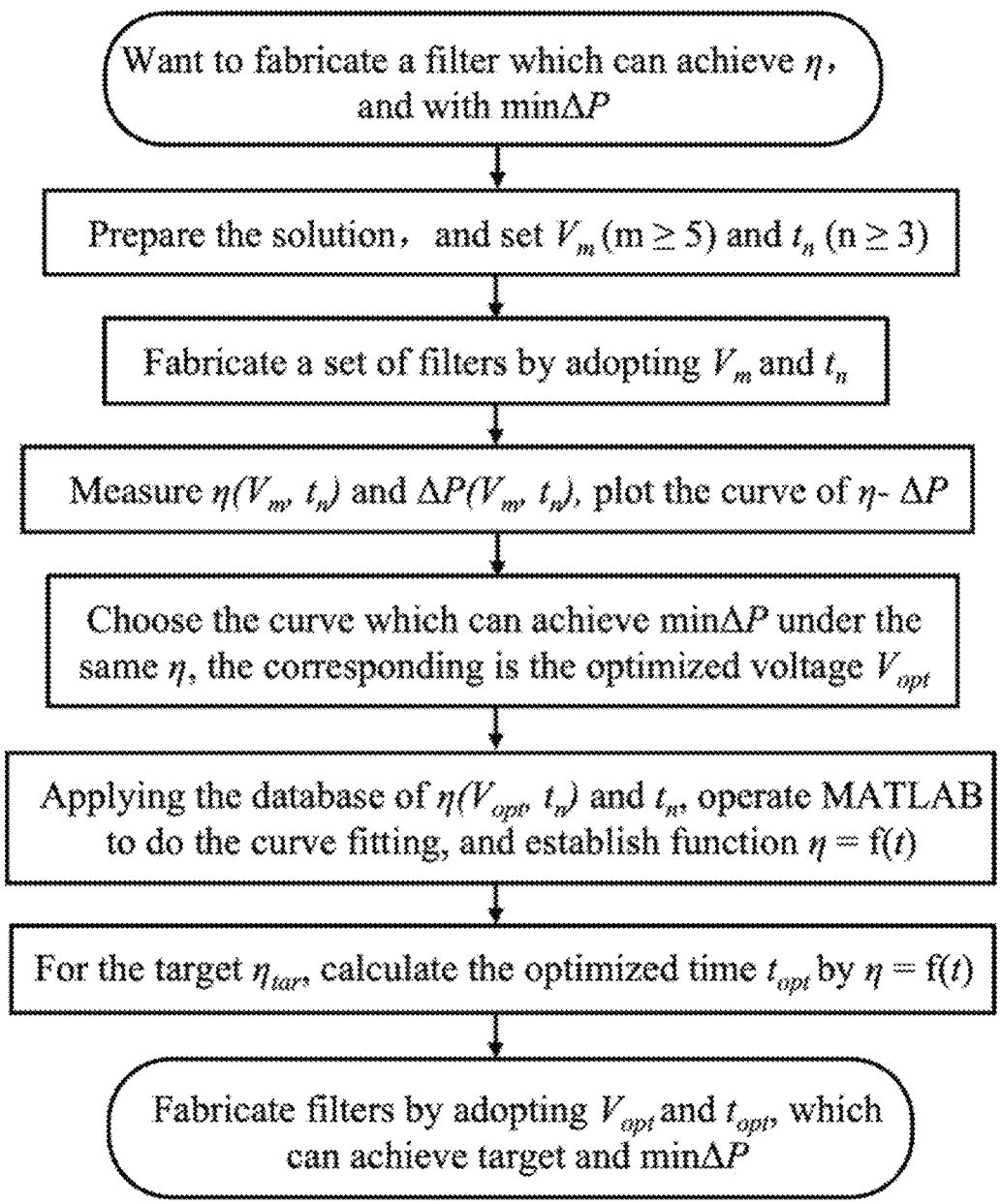
FIG. 4 is a schematic flowchart of the electrospinning method for fabricating a nanofiber air filter with a minimized pressure drop according to an embodiment of the present disclosure.

Referring to FIG. 3, in an embodiment, the step of S3 comprises the following steps:

S31, drawing relationship curves between the particle removal efficiency $\eta(V_m, t_n)$ and the pressure drop $\Delta P(V_m, t_n)$; under the same particle removal efficiency, the relationship curve which achieves the lowest pressure is an optimal condition, and corresponding electrospinning voltage $V_m$ is the optimal voltage $V_{opt}$;

S32, selecting values of the $\eta(V_{opt}, t_n)$ and $t_n$ to fit a following polynomial function by mathematical software:

$\eta = f(t) = 1 - \exp(a \cdot t + b)$; wherein t represents electrospinning time, $\eta$ may represents particle removal efficiency, a and b are constants; and S33, setting a target particle removal efficiency $\eta_{tar}$, corresponding optimal electrospinning time $t_{opt}$ is calculated by the polynomial function $\eta=f(t)$.

In an embodiment, in the step of S31, the relationship curves can be drawn in Excel software. In an embodiment, in the step of S32, the mathematical software is MATLAB software.

The above are merely implementations of the present disclosure, which do not constitute a limitation on the scope of the present disclosure. Any equivalent structure or equivalent process change made based on the description and accompanying drawings of the present disclosure, or direct or indirect application thereof in other related technical fields, should still fall within the protection scope of the present disclosure.

What is claimed is:

1. An electrospinning method for fabricating a nanofiber air filter with a minimized pressure drop, comprising following steps:

S1. dissolving a specified amount of powder polymer material in a solvent, and magnetically stirring a resulting solution; adding the solution to a syringe connected with a microneedle by a plastic tube, and pumping the solution by the syringe into an electrospinning machine;

S2. allowing the electrospinning machine to work under a voltage, such that the solution generates nanofibers; the nanofibers are interweaved to fabricate air filters for removing particles in air with a particle removal efficiency $\eta(V_m, t_n)$ and pressure drop $\Delta P(V_m, t_n)$, $V_m$ is electrospinning voltage and $t_n$ is electrospinning time; and S3. finding optimal electrospinning voltage $V_{opt}$ and optimal electrospinning time $t_{opt}$, such that an air filter fabricated by $V_{opt}$ and $t_{opt}$ can achieve target particle removal efficiency $\eta_{tar}$ and minimized pressure drop $\Delta P_{min}$;

the step of S3 comprises the following steps:

S31, drawing relationship curves between the particle removal efficiency $\eta(V_m, t_n)$ and the pressure drop $\Delta P(V_m, t_n)$ of the air filter fabricated; under the same particle removal efficiency, the relationship curve which achieves the lowest pressure drop is an optimal condition, and corresponding electrospinning voltage $V_m$ is the optimal voltage $V_{opt}$;

S32, selecting values of the $\eta(V_{opt}, t_n)$ and $t_n$ to fit a following polynomial function by mathematical software:

$\eta=f(t)=1-\exp(a \cdot t+b)$; wherein t represents electrospinning time, $\eta$ represents particle removal efficiency, a and b are constants; and S33, setting the target particle removal efficiency $\eta_{tar}$, corresponding optimal electrospinning time $t_{opt}$ is calculated by the polynomial function $\eta=f(t)$.

2. The electrospinning method for fabricating a nanofiber air filter according to claim 1, the powder polymer material is polyacrylonitrile (PAN), polyvinylidene difluoride (PVDF), polystyrene (PS), or polyvinylpyrrolidone (PVP).

3. The electrospinning method for fabricating a nanofiber air filter with a minimized pressure drop according to claim 2, the microneedle is perpendicular to a rotator, and the nanofibers are collected by the rotator covered by a copper mesh.

4. The electrospinning method for fabricating a nanofiber air filter with a minimized pressure drop according to claim 3, the electrospinning machine prepares the nanofibers respectively under M different electrostatic spinning voltages and N different spinning time conditions; M is an integer no less than 5, N is an integer no less than 3; m is an integer no less than 1 and no larger than M, n is an integer no less than 1 and no larger than N.

5. The electrospinning method for fabricating a nanofiber air filter with a minimized pressure drop according to claim 4, the pressure drop $\Delta P(V_m, t_n)$ is measured by a manometer.

6. The electrospinning method for fabricating a nanofiber air filter with a minimized pressure drop according to claim 5, particle concentrations of upstream flow $C_1$ and downstream flow $C_2$ are measured by particle counters, and the particle removal efficiency $\eta(V_m, t_n)$ is calculated by a following formula:

$$\eta = \frac{C_1 - C_2}{C_1} \times 100\%.$$

7. The electrospinning method for fabricating a nanofiber air filter with a minimized pressure drop according to claim 1, in the step of S31, the relationship curves are drawn in Excel software.

8. The electrospinning method for fabricating a nanofiber air filter with a minimized pressure drop according to claim 1, in the step of S32, the mathematical software is MATLAB software.

9. The electrospinning method for fabricating a nanofiber air filter with a minimized pressure drop according to claim 1, in the step of S1, the syringe and the microneedle are arranged vertically; the microneedle is arranged at a lower center of the syringe.

10. The electrospinning method for fabricating a nanofiber air filter with a minimized pressure drop according to claim 9, in the step of S2, a Taylor cone is formed by the solution under the voltage, and the nanofibers are continuously injected along a dynamic spiral trajectory.

* * * * *